US008997475B2

(12) United States Patent
Ingersoll et al.

(10) Patent No.: US 8,997,475 B2
(45) Date of Patent: Apr. 7, 2015

(54) COMPRESSOR AND EXPANDER DEVICE WITH PRESSURE VESSEL DIVIDER BAFFLE AND PISTON

(75) Inventors: Eric D. Ingersoll, Cambridge, MA (US); Justin A. Aborn, Hingham, MA (US); Luc Aalmans, Cambridge, MA (US); Matthew Blieske, Francestown, NH (US)

(73) Assignee: General Compression, Inc., Newton, MA (US)

(*) Notice: Subject to any disclaimer, the term of this patent is extended or adjusted under 35 U.S.C. 154(b) by 208 days.

(21) Appl. No.: 13/347,144

(22) Filed: Jan. 10, 2012

(65) Prior Publication Data

US 2012/0222424 A1  Sep. 6, 2012

Related U.S. Application Data

(60) Provisional application No. 61/431,259, filed on Jan. 10, 2011.

(51) Int. Cl.
*F16D 31/02* (2006.01)
*F01K 1/00* (2006.01)
(Continued)

(52) U.S. Cl.
CPC ... *F02G 1/02* (2013.01); *F02C 6/16* (2013.01); *Y02E 60/15* (2013.01); *F04B 23/021* (2013.01); *F04B 23/023* (2013.01); *F04B 41/02* (2013.01)

(58) Field of Classification Search
CPC .............. F02G 1/02; F04B 23/021; F04B 23/00–23/023
USPC ........... 60/516–531, 650, 659, 682, 413–418, 60/508–515; 417/92, 103, 439, 502, 503; 62/6, 401–403; 138/30, 31; 91/4 R, 4 A; 92/6 R, 6 D
See application file for complete search history.

(56) References Cited

U.S. PATENT DOCUMENTS 114,297 A   5/1871   Ivens et al.
224,081 A   2/1880   Eckart
(Continued)

FOREIGN PATENT DOCUMENTS

GB    2013318        8/1979
JP    55-064531 U  *  5/1980
(Continued)

OTHER PUBLICATIONS

International Search Report and Written Opinion for International Patent Application No. PCT/US2012/020749 dated Oct. 15, 2013 (15 pages).
(Continued)

*Primary Examiner* — Thomas Denion
*Assistant Examiner* — Laert Dounis
(74) *Attorney, Agent, or Firm* — Goodwin Procter LLP

(57) ABSTRACT

An apparatus can include a pressure vessel that defines an interior region that can contain a liquid and/or a gas. A piston is movably disposed within the interior region of the pressure vessel. A divider is fixedly disposed within the interior region of the pressure vessel and divides the interior region into a first interior region on a first side of the divider and a second interior region on a second, opposite side of the divider. The piston is movable between a first position in which fluid having a first pressure is disposed within the first interior region and the first interior region has a volume less than a volume of the second interior region, and a second position in which fluid having a second pressure is disposed within the second interior region and the second interior region has a volume less than a volume of the first interior region.

12 Claims, 5 Drawing Sheets

(51) Int. Cl.
*F15B 11/072* (2006.01)
*F02G 1/02* (2006.01)
*F04B 23/02* (2006.01)
*F04B 41/02* (2006.01)
*F02C 6/16* (2006.01)

(56) References Cited

U.S. PATENT DOCUMENTS

| | | |
|---|---|---|
| 233,432 A | 10/1880 | Pitchford |
| 320,482 A | 6/1885 | Leavitt |
| 874,140 A | 12/1907 | Valiquet |
| 943,000 A | 12/1909 | Busby |
| 1,045,961 A | 12/1912 | Ferranti |
| 1,147,204 A | 7/1915 | Anheuser |
| 1,230,028 A | 6/1917 | Rardon |
| 1,353,216 A | 9/1920 | Carlson |
| 1,369,596 A | 2/1921 | Yanacopoulos |
| 1,635,524 A | 7/1927 | Aikman |
| 1,681,280 A | 8/1928 | Bruckner |
| 1,918,789 A | 7/1933 | Ttisworth |
| 1,947,304 A | 2/1934 | Morro |
| 2,025,142 A | 12/1935 | Zahm et al. |
| 2,042,991 A | 6/1936 | Harris, Jr. |
| 2,141,703 A | 12/1938 | Bays |
| 2,150,122 A | 3/1939 | Kollberg et al. |
| 2,280,100 A | 4/1942 | Singleton |
| 2,280,845 A | 4/1942 | Parker |
| 2,339,086 A | 8/1944 | Makaroff |
| 2,397,734 A * | 4/1946 | Goebel et al. .................. 60/526 |
| 2,404,660 A | 7/1946 | Rouleau |
| 2,420,098 A | 5/1947 | Rouleau |
| 2,454,058 A | 11/1948 | Hays |
| 2,479,856 A | 8/1949 | Mitton |
| 2,539,862 A | 1/1951 | Rushing |
| 2,628,564 A | 2/1953 | Jacobs |
| 2,683,964 A | 7/1954 | Anxionnaz et al. |
| 2,706,077 A | 4/1955 | Searcy |
| 2,712,728 A | 7/1955 | Lewis et al. |
| 2,813,398 A | 11/1957 | Wilcox |
| 2,824,687 A | 2/1958 | Osterkamp |
| 2,829,501 A | 4/1958 | Walls |
| 2,880,759 A | 4/1959 | Wisman |
| 2,898,183 A | 8/1959 | Fauser |
| 3,014,639 A | 12/1961 | Boli |
| 3,041,842 A | 7/1962 | Heinecke |
| 3,232,524 A | 2/1966 | Rice at al. |
| 3,236,512 A | 2/1966 | Caslav et al. |
| 3,269,121 A | 8/1966 | Ludwig |
| 3,355,096 A | 11/1967 | Hornschuch |
| 3,373,694 A | 3/1968 | Taplin |
| 3,467,140 A * | 9/1969 | Hanson ........................... 138/31 |
| 3,523,192 A | 8/1970 | Lang |
| 3,530,681 A | 9/1970 | Dehne |
| 3,538,340 A | 11/1970 | Lang |
| 3,608,311 A | 9/1971 | Roesel, Jr. |
| 3,618,470 A | 11/1971 | Mueller et al. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Rigollot |
| 3,792,643 A | 2/1974 | Scheafer |
| 3,793,848 A | 2/1974 | Eskeli |
| 3,796,044 A | 3/1974 | Schwarz |
| 3,801,793 A | 4/1974 | Goebel |
| 3,802,795 A | 4/1974 | Nyeste |
| 3,803,847 A | 4/1974 | McAlister |
| 3,806,733 A | 4/1974 | Haanen |
| 3,818,801 A | 6/1974 | Kime |
| 3,832,851 A | 9/1974 | Kiernan |
| 3,835,918 A | 9/1974 | Pilarczyk |
| 3,839,863 A | 10/1974 | Frazier |
| 3,847,182 A | 11/1974 | Greer |
| 3,854,301 A | 12/1974 | Cytryn |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,968,732 A | 7/1976 | Fitzgerald |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,009,587 A | 3/1977 | Robinson, Jr. et al. |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,053,395 A | 10/1977 | Switzgable |
| 4,055,950 A | 11/1977 | Grossman |
| 4,058,979 A | 11/1977 | Germain |
| 4,079,586 A | 3/1978 | Kincaid, Jr. |
| 4,079,591 A | 3/1978 | Derby |
| 4,089,744 A | 5/1978 | Cahn |
| 4,090,940 A | 5/1978 | Switzgable |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,343 A | 9/1978 | Hoffelns |
| 4,117,696 A | 10/1978 | Fawcett et al. |
| 4,118,637 A | 10/1978 | Tackett |
| 4,124,182 A | 11/1978 | Loeb |
| 4,124,805 A | 11/1978 | Jacoby |
| 4,126,000 A | 11/1978 | Funk |
| 4,136,432 A | 1/1979 | Melley, Jr. |
| 4,137,015 A | 1/1979 | Grossman |
| 4,142,368 A | 3/1979 | Mantegani |
| 4,143,522 A | 3/1979 | Hamrick |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,601 A | 6/1980 | Eberle |
| 4,206,608 A | 6/1980 | Bell |
| 4,209,982 A | 7/1980 | Pitts |
| 4,215,548 A | 8/1980 | Beremand |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,236,083 A | 11/1980 | Kenney |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,265,599 A | 5/1981 | Morton |
| 4,273,514 A | 6/1981 | Shore et al. |
| 4,274,010 A | 6/1981 | Lawson-Tancred |

(56) References Cited

U.S. PATENT DOCUMENTS

| | | |
|---|---|---|
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,329,842 A | 5/1982 | Hoskinson |
| 4,335,093 A | 6/1982 | Salomon |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,362,462 A | 12/1982 | Blotenberg |
| 4,363,703 A | 12/1982 | ElDifrawi |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,372,332 A | 2/1983 | Mast |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,426,846 A | 1/1984 | Bailey |
| 4,428,711 A | 1/1984 | Archer |
| 4,435,131 A | 3/1984 | Ruben |
| 4,466,244 A | 8/1984 | Wu |
| 4,478,556 A | 10/1984 | Gozzi |
| 4,537,558 A | 8/1985 | Tsunoda et al. |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,959,958 A | 10/1990 | Nishikawa et al. |
| 5,099,648 A | 3/1992 | Angle |
| 5,138,936 A | 8/1992 | Kent |
| 5,142,870 A | 9/1992 | Angle |
| 5,161,865 A | 11/1992 | Higashimate et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| RE39,249 E | 8/2006 | Link, Jr. |
| 7,210,496 B2 | 5/2007 | Suzuki |
| 7,219,682 B2 | 5/2007 | Agnew et al. |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 2003/0180155 A1 | 9/2003 | Coney et al. |
| 2005/0180864 A1 | 8/2005 | Ursan et al. |
| 2006/0078445 A1 | 4/2006 | Carter, III et al. |
| 2006/0218908 A1 | 10/2006 | Abou-Raphael |
| 2006/0248886 A1 | 11/2006 | Ma |
| 2007/0187918 A1 | 8/2007 | Mizuno |
| 2008/0060862 A1 | 3/2008 | Schlele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1* | 12/2009 | Bollinger ............ 60/652 |
| 2010/0018196 A1 | 1/2010 | Li et al. |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1* | 12/2010 | Fong et al. ............ 60/325 |
| 2010/0326064 A1 | 12/2010 | Fong et al. |
| 2010/0326066 A1 | 12/2010 | Fong et al. |
| 2010/0326068 A1 | 12/2010 | Fong et al. |

(56) References Cited

U.S. PATENT DOCUMENTS

| | | |
|---|---|---|
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0109094 A1* | 5/2011 | Kenway et al. ............ 290/55 |
| 2011/0131966 A1 | 6/2011 | Mcbride et al. |
| 2011/0167813 A1 | 7/2011 | McBride et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |

FOREIGN PATENT DOCUMENTS

| | | |
|---|---|---|
| JP | S556453 A | 5/1980 |
| WO | WO 90/03516 | 4/1990 |
| WO | WO-9204584 A1 | 3/1992 |
| WO | WO 93/06367 | 4/1993 |
| WO | WO 98/17492 | 4/1998 |
| WO | WO 2005/069847 | 8/2005 |
| WO | WO 2008/139267 | 11/2008 |
| WO | WO 2009/034548 | 3/2009 |
| WO | WO 2010/135658 | 11/2010 |
| WO | WO 2011/079267 | 6/2011 |
| WO | WO 2011/079271 | 6/2011 |

OTHER PUBLICATIONS

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA. Argonne National Laboratory, Argonne, Illinois, 24 pages.

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15.

Carbon Trust, "Hydraulic Transmission System for Large Wind Turbines," Jan. 2007, 1 page.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

Sanderson, A. E., "Hydraulic System for Control of Power Windmills," undated, 11 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.

"Swash-plate Type Axial Piston Pumps for Open Circuits in General Industrial Machinery," Kawasaki K3VG, Kawasaki Motor Corp., USA, 2006, 24 pages.

International Search Report and Written Opinion for International Application No. PCT/US2010/062010, mailed Apr. 13, 2011.

International Search Report and Written Opinion for International Application No. PCT/US2010/035795, mailed Oct. 13, 2011.

Invitation to Pay Additional Fees and Communication Relating to the Results of the Partial International Search for International Application No. PCT/US2010/035795, dated May 31, 2011, 6 pages.

Office Action for U.S. Appl. No. 12/785,093, mailed Oct. 31, 2011, 7 pages.

Office Action for U.S. Appl. No. 12/785,100, mailed Nov. 23, 10 pages.

Office Action for U.S. Appl. No. 13/294,862, mailed Jan. 30, 2011 6 pages.

First Action Interview Pilot Program Pre-Interview Communication for U.S. Appl. No. 12/977,724, mailed Oct. 28, 2011.

Office Action for U.S. Appl. No. 13/294,660, mailed Jan. 18, 2012, 7 pages.

International Search Report and Written Opinion for International Application No. PCT/US2010/062016, mailed Jan. 19, 2012.

Cyphelly et al., "Usage of Compressed Air Storage Systems," Program Elektricity, Final Report May 2004, Ordered by the Swiss Federal Office of Energy.

* cited by examiner

US 8,997,475 B2

COMPRESSOR AND EXPANDER DEVICE WITH PRESSURE VESSEL DIVIDER BAFFLE AND PISTON

CROSS-REFERENCE TO RELATED APPLICATION

This application claims priority to and the benefit of U.S. Provisional Patent Application Ser. No. 61/431,259, entitled "Compressor and/or Expander Device," filed Jan. 10, 2011, the disclosure of which is hereby incorporated by reference herein in its entirety.

BACKGROUND

The invention relates generally to devices, systems and methods for the compression and/or expansion of a gas, such as air, and/or the pressurization of a liquid, such as water.

Known devices and systems can include a cylindrical housing with a movable piston disposed therein. Some known devices include the use of a gas, such as air, to move the piston to produce an output of work. Some pneumatic devices are used to compress and/or expand a gas, such as air. For example, a piston can be moved within a cylinder to push or move the gas out of the cylinder at an increased pressure. Such a device can be used, for example, in a compressed air energy storage system. Other devices can be used to pressurize a liquid, such as water, and/or pump the pressurized liquid, by applying force/work to a piston disposed within a cylinder in contact with the liquid. Such devices, or other devices, can also produce an output of work by the urging of pressurized liquid into the cylinder and against the piston.

Compressed air energy storage (CAES) systems are types of systems for storing energy in the form of compressed air. CAES systems can be used to store energy by converting energy from one form, such as electricity, into another form, such as compressed air. CAES systems can be valuable because of their ability to convert between forms of energy that are relatively difficult to store, such as electricity, and forms of energy that are be relatively easy to store, such as the potential energy available in a compressed gas (e.g. air). If a CAES system converts between electricity and compressed gas, when electricity demand is low, typically during the night, it may release the energy when demand is high, typically during the day. Such systems include at least one compressor that operates to compress gas for storage; and at least one turbine, separate from the compressor, to expand compressed gas to produce electricity. Typical systems include multiple compressors and turbines which can create expensive and complex systems not suitable for widespread use.

Such known devices and systems used to compress and/or expand a gas and/or to pressurize and/or pump a liquid can generate heat during, for example, a compression process. Various heat transfer mechanisms can be used to remove heat generated during the compression process. There is a need to improve and/or optimize the heat transfer methods used within devices and systems used to compress and/or expand air. There is also a need for a system that reduces the number of components of a typical CAES system, and for a system that operates efficiently, and for a system that is suitable for widespread use.

SUMMARY OF THE INVENTION

In some embodiments, an apparatus includes a pressure vessel that defines an interior region in which at least one of a liquid and a gas can be contained. A piston is movably disposed within the interior region of the pressure vessel. A baffle is fixedly disposed within the interior region of the pressure vessel. The baffle divides the interior region into a first interior region on a first side of the baffle and a second interior region on a second, opposite side of the baffle. The piston is movable between a first position in which fluid having a first pressure is disposed within the first interior region and the first interior region has a volume less than a volume of the second interior region, and a second position in which fluid having a second pressure is disposed within the second interior region and the second interior region has a volume less than a volume of the first interior region. In some embodiments, two baffles divide the interior region into a first interior region on a first side of the first baffle, a second interior region on a second, opposite side of the second baffle, and a piston region between the first interior region and the second interior region. The two baffles are configured to reduce the pressure drop of liquid moving from the piston region to the first and second interior regions, and to maintain the liquid level of the piston region.

DETAILED DESCRIPTION

Figure 1:
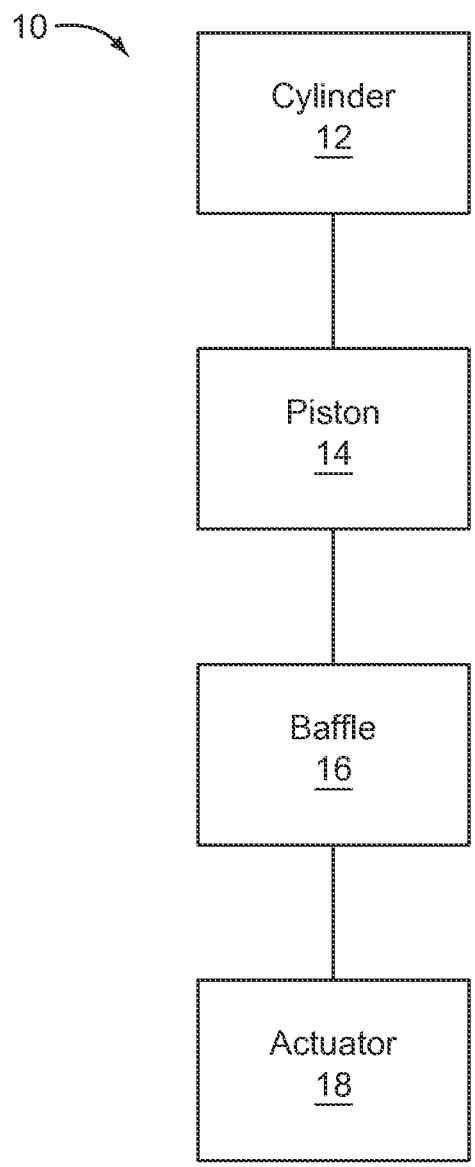
FIG. 1 is a schematic illustration of a compression and expansion device according to an embodiment.

Devices and systems used to compress and/or expand a gas, such as air, and/or to pressurize and/or pump a liquid, such as water, are described herein. Pneumatic devices described herein can be used to compress gas within a cylinder or pressure vessel. As described herein, a piston can be movably disposed within a cylinder or pressure vessel and actuated to compress air within the cylinder or pressure vessel. Pneumatic devices as described herein can include what is referred as "a baffle" (also referred to herein as a "divider" or "separator") disposed within the interior region of the cylinder. The baffle can provide a fluid-tight seal between the piston and the cylinder wall during movement of the piston relative to the cylinder. In some embodiments, pneumatic devices as described herein can be used in a compressed air energy storage (CAES) system.

In some CAES systems, devices can be actuated with, for example, hydraulic and/or pneumatic actuators. For example, in some compressed gas devices and systems, a mechanical piston can be used to move or compress gas, such as air. In some compressed gas devices and systems, a hydraulic actuator can be used to move or compress gas within a pressure vessel. For example, an actuator can move a liquid within a pressure vessel such that the liquid compresses a gas in the pressure vessel. Such compression devices and systems are described in U.S. Provisional App. No. 61/216,942 and U.S. Patent Publication Nos. 2011/0061741, 2011/0061836 and 2011/0062166, each entitled "Compressor and/or Expander Device" (collectively referred to as "the Compressor and/or Expander Device applications"), and are incorporated herein by reference in their entirety. The Compressor and/or Expander Device applications describe a CAES system that can include multiple stages of compression and/or expansion. As described herein, compressor/expander devices using sliding or rolling seals can also be used within a CAES system. Such rolling seals are described in U.S. patent application Ser. No. 13/312,467, entitled "Compressor and/or Expander Device with Rolling Piston Seal," ("the Rolling Piston Seal application"), the disclosure of which is incorporated herein by reference in its entirety.

In some embodiments, an apparatus includes a pressure vessel that defines an interior region in which at least one of a liquid and a gas can be contained. A piston is movably disposed within the interior region of the pressure vessel. A baffle is fixedly disposed within the interior region of the pressure vessel. The baffle divides the interior region into a first interior region on a first side of the baffle and a second interior region on a second, opposite side of the baffle. The piston is movable between a first position in which fluid having a first pressure is disposed within the first interior region and the first interior region has a volume less than a volume of the second interior region, and a second position in which fluid having a second pressure is disposed within the second interior region and the second interior region has a volume less than a volume of the first interior region. The piston can have any cross-section including a circular, semi-circular oval, rectangular, square, triangular, c-shaped, or any other shaped cross-section that can form a piston.

In some embodiments, an apparatus includes a pressure vessel that defines an interior region of the pressure vessel. A piston is movably disposed within the interior region of the pressure vessel. Two baffles are fixedly disposed within the interior region of the pressure vessel. The two baffles divide the interior region into a first interior region on a first side of the first of the two baffles, a second region on a second side of the second of the two baffles, the second side of the second baffle opposite the first side of the first baffle, and a piston region between the first interior region and the second interior region. The piston is movable between a first position within the piston region, at or near the first baffle and a second position within the piston region, at or near the second baffle.

FIG. 1 is a schematic illustration of a compressor/expander device according to an embodiment. A compressor/expander device 10 (also referred to as "compression device 10") includes a cylinder 12 (also referred to herein as "pressure vessel") and a piston 14 movably disposed within an interior region (not shown) defined by the cylinder 12. At least one baffle 16 is disposed within the interior region of the cylinder 12 and is attached to the cylinder 12. The compressor device 10 can be used, for example, to compress a gas, such as air, within the cylinder 12.

The cylinder 12 can include an inlet conduit (not shown in FIG. 1) and an outlet conduit (not shown in FIG. 1) each in fluid communication with the interior region of the cylinder 12. The compressor device 10 can include multiple valves (not shown in FIG. 1) coupled to the inlet conduit and/or outlet conduit and/or to the cylinder 12. The valves can be configured to operatively open and close the fluid communication to and from the cylinder 12. Examples of use of such valves are described in more detail in the Compressor and/or Expander Device applications incorporated by reference above. The cylinder 12 can contain within the interior region a fluid, such as a liquid and/or a gas that can be communicated to and from the interior region via the inlet conduit and the outlet conduit, respectively.

The piston 14 is movably disposed within the interior region of the cylinder 12 and can also be coupled to an actuator 18 via a piston rod (not shown in FIG. 1). The actuator 18 can be for example, an electric motor or a hydraulically driven actuator such as, for example, the hydraulic actuators described in U.S. Provisional Patent App. No. 61/290,107, filed Dec. 24, 2009, and U.S. Patent Publication No. 2011/0258996, filed Dec. 23, 2010, each entitled "System and Methods for Optimizing Efficiency of a Hydraulically Actuated System," the disclosures of which are incorporated herein by reference in their entirety. The actuator 18 can be used to move the piston 14 back and forth within the interior region of the cylinder 12.

The baffle 16 can be fixedly disposed within the interior region of the cylinder 12 and can divide the interior region between a first interior region (not shown in FIG. 1) and a second interior region (not shown in FIG. 1). The baffle 16 is configured to allow the piston 14 to move from a first position, within the first interior region, to a second position, within the second interior region. The baffle 16 can provide a fluid-tight seal between the piston 14 and the cylinder 12 during movement of the piston relative to the cylinder. In some embodiments, more than one baffle 16 can be fixedly disposed within the interior region of the cylinder 12.

The baffle 16 is shaped to allow the piston 14 to move from a first position, within the first interior region, to a second position, within the second interior region while maintaining a fluid-tight seal between the baffle 16 and the piston 14. As the piston 14 moves back and forth within the interior region of the cylinder 12, a volume of the first interior region and a volume of the second interior region will each change. For example, when the piston 14 moves from the first position in which the first interior region has a volume of fluid less than the volume of fluid in the second interior region, to the second position, fluid within the second interior region is displaced by the piston 14 such that the second interior region then has a volume of fluid less than a volume of fluid in the first interior region. When the piston 14 moves from the second position in which the second interior region has a volume of fluid less than the volume of fluid in the first interior region, to the first position, fluid within the first interior region is displaced by the piston 14 such that the first interior region then has a volume of fluid less than a volume of fluid in the second interior region. As used herein, "fluid" means a liquid, gas, vapor, suspension, aerosol, or any combination of thereof.

In some embodiments, two baffles 16 can be disposed within the interior region of the cylinder 12. Each of the two baffles 16 can be fixedly disposed within the interior region of the cylinder 12 and can divide the interior region between a first interior region, a second interior region, and a piston region (not shown) disposed between the first interior region and the second interior region. In some embodiments, the piston 14 can further divide the piston region into a first piston region portion (not shown in FIG. 1) on one side of the piston 14 and a second piston region portion (not shown in FIG. 1) on a second side of the piston 14, opposite the first side of the piston 14. In some embodiments, the piston 14 can move from a first position within the piston region to a second position within the piston region. When the piston 14 moves from the first position to the second position, fluid within the second piston region portion can be moved into the second interior region, and fluid within the first interior region can be moved into the first piston region portion. When the piston 14 moves from the second position to the first position, fluid within the first piston region portion can be moved into the first interior region, and fluid within the second interior region can be moved into the second piston region portion.

In some embodiments, each of two baffles 16 can be shaped to reduce a pressure drop that may occur when fluid moves from the first and second piston region portions to the first and second interior regions, respectively. In some embodiments, the size of each of baffles 16 can be changed, such as, for example, the size of each of baffles 16 can be reduced to create a bigger fluid passageway (not shown) between the piston region and the first and/or second interior regions. In some embodiments, each of the baffles 16 can include a baffle edge (not shown in FIG. 1) that can be shaped to reduce the pressure drop that can occur when fluid moves from a piston region portion to the first interior region or to the second interior region.

In some embodiments, each of the baffles 16, and each of the edges of the baffles 16, can be sized and shaped to maintain a fluid level within the piston region relative to a fluid level in the first interior region or in the second interior region. In some embodiments, a fluid level within the first piston region portion can be higher than a fluid level in the first interior region when the piston 14 is moving from the first position to the second position. In some embodiments, a fluid level within the second piston region portion can be higher than a fluid level in the second interior region when the piston 14 is moving from the second position to the first position.

In some embodiments, the piston 14 is moved within the cylinder 12 to compress a gas, such as air, within the cylinder 12. In some embodiments, the compressor device 10 can be configured to be double-acting in that the piston 14 can be actuated in two directions. In other words, the piston 14 can be actuated to compress and/or expand gas (e.g., air) in two directions. For example, in some embodiments, as the piston 14 is moved in a first direction, a first volume of fluid having a first pressure can enter the first interior region of the cylinder 12 on one side of the piston 14, and a second volume of gas having a second pressure can be compressed by the other side of the piston 14 in the second interior region and then exit the second interior region. When the piston 14 is moved in a second direction opposite the first direction, the first volume of gas within the first interior region can be compressed by the piston 14 and then exit the first interior region having a third pressure greater than the first pressure, and simultaneously a third volume of gas can enter the second interior region.

Figure 2B:
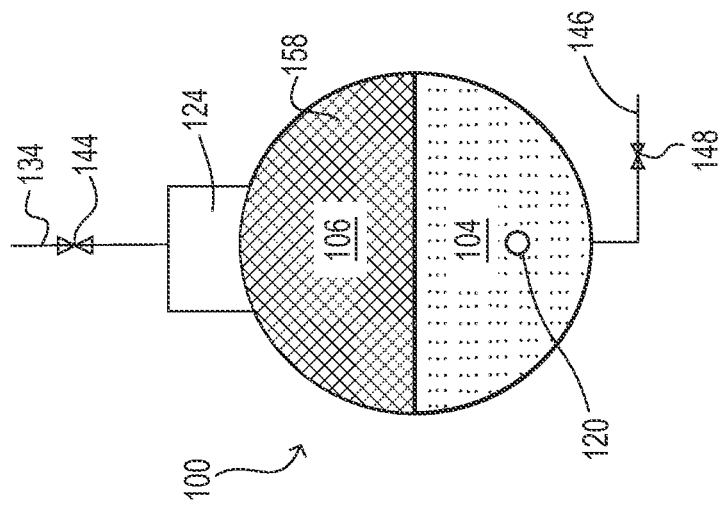
FIG. 2B is a partial cross-sectional view of the compression and expansion device of FIG. 2A taken along the line 2B-2B in FIG. 2A.
Figure 2A:
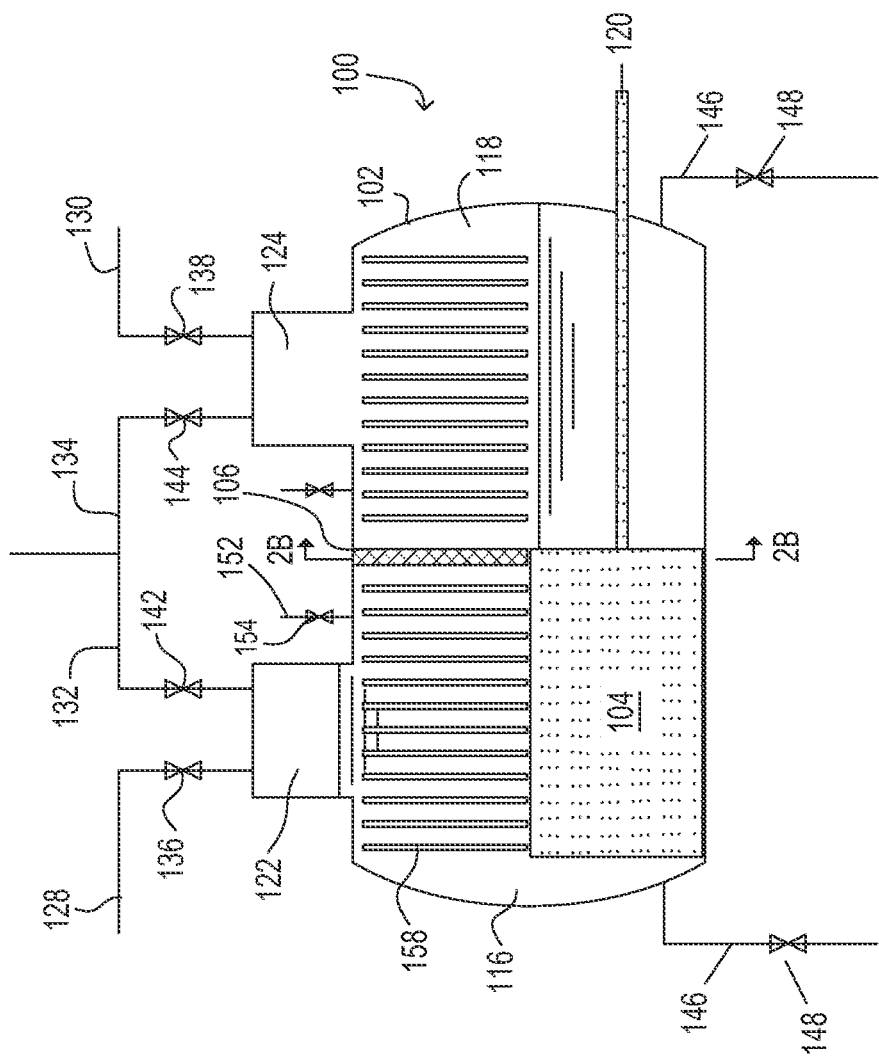
FIG. 2A is a partial cross-sectional side-view of a compression and expansion device according to an embodiment.

FIGS. 2A and 2B illustrate another embodiment of a compressor device. A compressor device 100 includes a cylinder or pressure vessel 102, a piston 104 movably disposed within an interior region defined by the cylinder 102, and a baffle 106. The baffle 106 is disposed within the interior region of the cylinder 102 and is attached to the cylinder 102. The compressor device 100 can be used, for example, to compress a gas, such as air, within the cylinder 102.

The interior region of the cylinder 102 is divided into a first interior region 116 and a second interior region 118. The first interior region 116 can include a first inlet/outlet chamber 122 and the second interior region 118 can include a second inlet/outlet chamber 124. The first inlet/outlet chamber 122 can include an inlet conduit 128 (also referred to as "inlet" or "air inlet") and an outlet conduit 132 (also referred to as "outlet" or "air outlet") each in fluid communication with the first interior region 116 of the cylinder 102. The cylinder 102 can contain within the first interior region 116 a fluid, such as a liquid and/or a gas that can be communicated to and from the first interior region 116 via the first inlet/outlet chamber 122. The inlet conduit 128 can be coupled to for example, a source of gas, such as air. The outlet conduit 132 is configured to communicate a volume of compressed gas (e.g., air) from the first interior region 116 to another location. For example, the outlet conduit 132 can be coupled to another compressor/expander device or another device configured to perform some action or work, or to a storage container configured to store compressed air. Valves 136, 142 can be coupled to the inlet conduit 128 and the outlet conduit 132, respectively, and can be operated to open and close the fluid communication to and from the cylinder 102. The valves can also be passive valves, for example check valves, that open and close the fluid communication to and from the cylinder 102 based on pressure differential. As discussed above, examples of operation of such valves are also described in the Compressor and/or Expander Device applications incorporated by reference above.

The second inlet/outlet chamber 124 can include an inlet conduit 130 (also referred to as "inlet" or "air inlet") and an outlet conduit 134 (also referred to as "outlet" or "air outlet") each in fluid communication with the second interior region 118 of the cylinder 102. The cylinder 102 can contain within the second interior region 118 a fluid, such as a liquid and/or a gas that can be communicated to and from the second interior region 118 via the second inlet/outlet chamber 124. The inlet conduit 130 can be coupled to, for example, a source of gas, such as air. The outlet conduit 134 is configured to communicate a volume of compressed gas (e.g., air) from the second interior region 118 to another location. For example, the outlet conduit 134 can be coupled to another compressor/expander device or another device configured to perform some action or work, or to a storage container configured to store compressed air. Valves 138, 144 can be coupled to the inlet conduit 130 and the outlet conduit 144, respectively, and can be operated to open and close the fluid communication to and from the cylinder 102. The air inlet valves 136, 138, and the air outlet valves 142, 144, can be any valve suitable for compressed air systems. Particularly, the air inlet valves 136, 138 and the air outlet valves 142, 144 can be configured to open and close rapidly to improve the speed and efficiency of both the compression and expansion operations.

Figure 4:
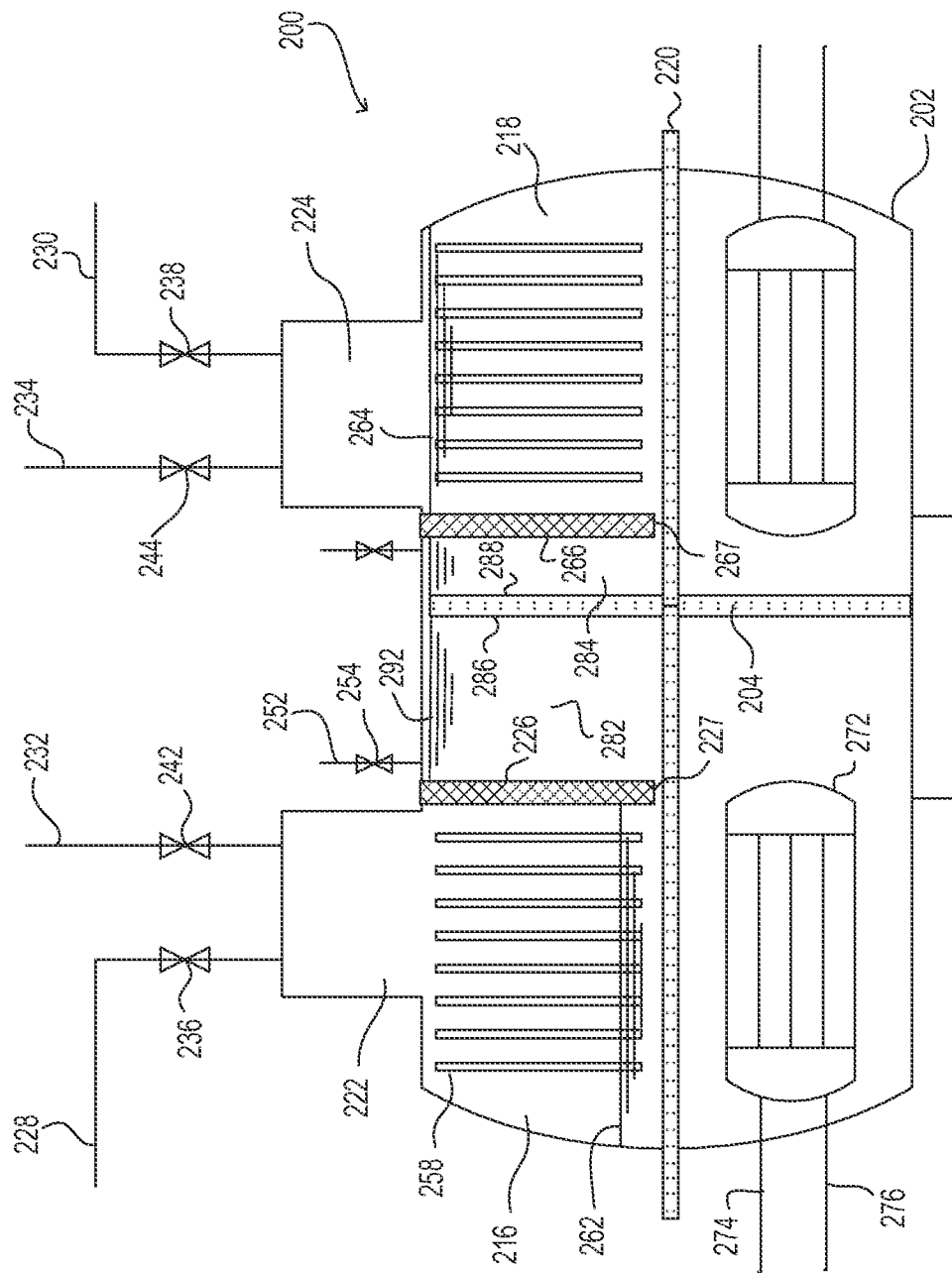
FIG. 4 is a partial cross-sectional view of a compression and expansion device according to another embodiment.

In some embodiments, the outlet conduit 132 can be coupled to the outlet conduit 134 (as shown in FIG. 2A) and configured to communicate volumes of compressed gas to the same location. Alternatively, the outlet conduit 132 can be fluidically isolated from the outlet conduit 134, such that they each are configured to communicate a volume of compressed gas to the same or different locations separately (as shown in the embodiment of FIG. 4). In alternative embodiments, the air outlet conduit 132 can be configured to communicate a volume of compressed gas to the second interior region 118. In this manner, the first interior region 116 can act as a first stage, and second interior region can act as a second stage, or vice versa.

The baffle 106 can be fixed inside the cylinder 102 using any suitable method and can be constructed of the same material as the cylinder 102, or any other compatible material. The baffle 106 combined with the piston 104 creates a fluid-tight seal between the first interior region 116 and the second interior region 118. In this manner, the space between the baffle 106 and the piston 104, and between the piston 104 and the cylinder 102 can be small enough to prevent substantial fluid transfer, i.e. each part can be precision machined, or seals can be provided for each space. Any suitable seal, such as, for example, a rolling seal can be used. Such rolling seals are described in the Rolling Piston Seal application incorporated by reference above.

In some embodiments, the baffle 106 can be formed at least partially from a rubber material. The rubber can be, for example, resistant to fluids and contaminants that may enter the compressor device 100, and have wear characteristics suitable for use in a compressor environment. In some embodiments, the baffle 106 can be formed with, for example, a natural rubber/polybutadiene rubber (NR/BR) blend. In some embodiments, the baffle 106 can be formed with a fabric material that is coated with, for example, a polymer. In some embodiments, the baffle 106 may include a coating of material (e.g., rubber or polymer) disposed on, for example, a substrate.

In some embodiments, the baffle 106 is formed with a rubber material with one or more reinforcement members embedded within the material. In some embodiments, the baffle 106 includes one or more reinforcement members that extend in a first direction and/or one or more reinforcement members that extend in a second direction. For example, some embodiments, a baffle 106 can include one or more reinforcement members that extend in first direction and one or more reinforcement members that extend in second direction that is transverse to the first direction. In some embodiments, the baffle 106 can include reinforcement members that extend in only a single direction. In some embodiments, the baffle 106 can include reinforcement member(s) formed with a laminate of two different grades of tyre cord disposed at 90 degrees, or an asymmetrically woven fabric. In some embodiments, one or more reinforcement members can be formed with a Nylon cord material, such as for example, Nylon 66, a polyaramid material such as Kevlar, or other suitable materials.

The piston 104 can be coupled to an actuator (not shown) via a piston rod 120 as described previously. The actuator can be used to move the piston 104 back and forth within the interior region of the cylinder 102. As the piston 104 moves back and forth within the interior region of the cylinder 102, a volume of the first interior region 116 and a volume of the second interior region 118 will each change. For example, the piston 104 can be moved between a first position in which the second interior region 118 has a greater volume than a volume of the first interior region 116, as shown in FIG. 2A, and a second position in which the first interior region 116 has a greater volume than a volume of the second interior region 118 (not shown).

As shown in FIG. 2A, the piston rod 120 can extend from the piston 104 in only one direction. In this manner, the piston rod 120 can be operatively coupled to a double acting actuator, i.e. the actuator is configured to move the piston 104 in both directions. Alternatively, the piston rod 120 can extend from the piston 104 in both directions (see, for example, the piston 204 and the piston rod 220 as depicted in FIG. 4). In this configuration, two actuators can be included and each actuator can be either single acting (i.e. each actuator is responsible for moving the piston 104 in only one direction), or each actuator can be double acting (i.e. each actuator is configured to move the piston 104 in both directions).

In some embodiments, one or more heat transfer elements 158 can be positioned within the interior regions 116, 118 of the cylinder 102 to increase an amount of surface area within the cylinder 102, over and above the surface area presented by cylinder 102 itself, that is in direct or indirect contact with air, which can improve heat transfer. The heat transfer element(s) 158 can provide for an increased heat transfer area both with air that is being compressed and with air that is being expanded (either through an air/liquid interface area or air/heat transfer element interface), while allowing the exterior structure and overall shape and size of a pressure vessel to be optimized for other considerations, such as pressure limits and/or shipping size limitations.

In some embodiments, the heat transfer element 158 can be a variety of different configurations, shapes, sizes, structures, etc. to provide a relatively high surface area per unit volume or mass with the air as it is being compressed within the compressor device 100. The heat transfer element 158 can be formed from one or more of a variety of different materials. For example, the heat transfer element 158 can be formed with metals, such as stainless steel, metal wires, hybrid wires, carbon fiber, and nano-materials. In some embodiments, it may be desirable to include a heat transfer element 158 that can be formed with a material that can provide high thermal conductivity in a transverse and a radial direction within the cylinder 102.

The heat transfer element 158 can be disposed at various locations within the interior region of the cylinder 102 so as to optimize the heat transfer within the cylinder 102. For example, in some embodiments, the heat transfer element 158 can be disposed within the cylinder 102 in a portion occupied by the air near the end of a compression cycle. Thus, as the air is compressed during the compression cycle, the mechanical work done on the air adds energy to the air. During the compression process, due to the presence and disposition of the heat transfer element 158, heat energy can be continuously transferred from the air to the heat transfer element 158. This transfer maintains the air temperature at a lower value than would be the case without the heat transfer element 158, and moderately increases the temperature of the heat transfer element 158. When the liquid level within the interior region 116, 118 rises during the compression stroke, heat is transferred from the transfer element 158 to the liquid.

The temperature of the liquid in the compressor device can be controlled by way of heat exchangers (as shown in the embodiment of FIG. 4), or by replacing all or a portion of the liquid with relatively cooler liquid, or by other ways known in the art. For example, each of the first interior region 116 and the second interior region 118 can include a vent conduit 152 (also referred to as "vent") and a purge conduit 146 in fluid communication with the cylinder 102. The purge conduits 146 can be fluidly coupled to, for example, a source of liquid, such as water. The purge conduits 146 are configured to communicate a volume of liquid (e.g., water) from the cylinder 102 to another location and return a liquid to the cylinder 102. The purge conduit 146, and the vent conduit 152 can be operated so as to add cooler liquid to cylinder 102, or can be operated to add warmer liquid to cylinder 102. For example, the purge conduit 146 can be coupled to a cooling tower, a containment pond, or another device configured to cool or contain a liquid. Valves 148, 154 can be coupled to the purge conduit 146 and the vent conduit 152, respectively, and can be operated to open and close the fluid communication to and from the cylinder 102.

By way of example, when the piston 104 is in the first position, as shown in FIG. 2A, the valve 148 on the purge conduit 146 coupled to the second interior region 118 can be opened to allow water contained within the second interior region 118 to flow out of the cylinder 102. Similarly, the vent valve 154 on the vent conduit 152 coupled to the second interior region 118 and/or the air inlet valve 138 can be opened to allow air to flow into the second interior region 118 to prevent a vacuum from forming After a volume of water has been removed, water at a relatively cooler, or relatively warmer temperature can be added to the second interior region 118 through the same purge conduit 146. Similarly, the vent valve 154 on the vent conduit 152 coupled to the second interior region 118 and/or the air inlet valve 138 can be opened to allow air to flow out of the second interior region 118 to allow the free flow of water into the cylinder 102. In alternative embodiments, each of the first interior region 116 and the second interior region 118 can include a dedicated conduit for removing liquid from the cylinder 102 and a dedicated conduit for adding liquid to the cylinder 102. While the process described above is with respect to the second interior region 118, a similar process can be used to fill or empty the first interior region 116.

Figure 3A:
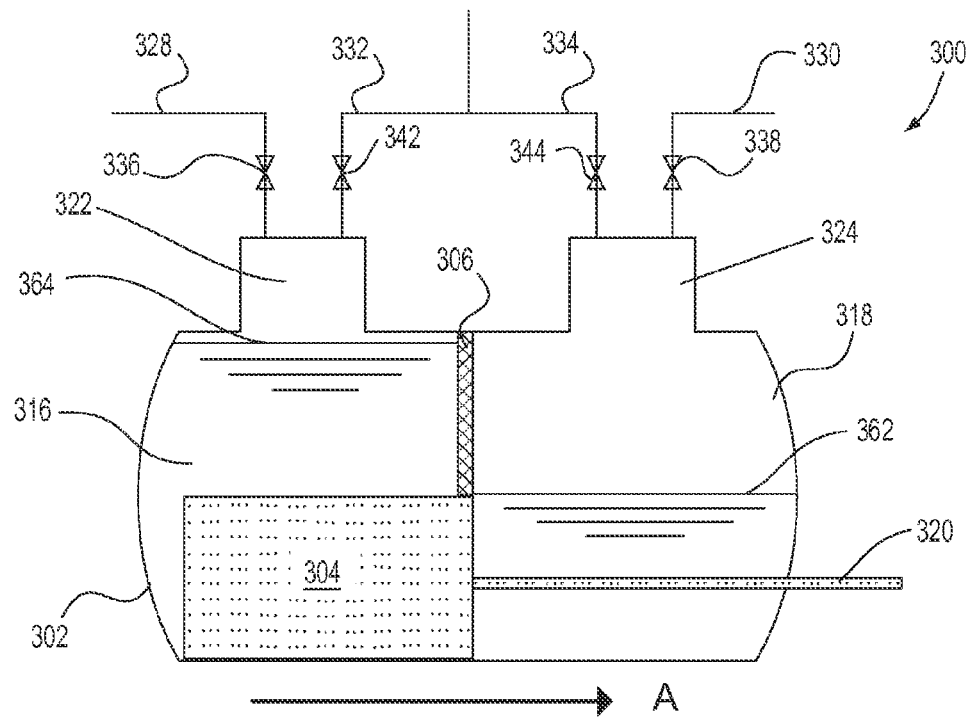
FIGS. 3A and 3B illustrate a process of compressing or expanding gas according to an embodiment.
Figure 3B:
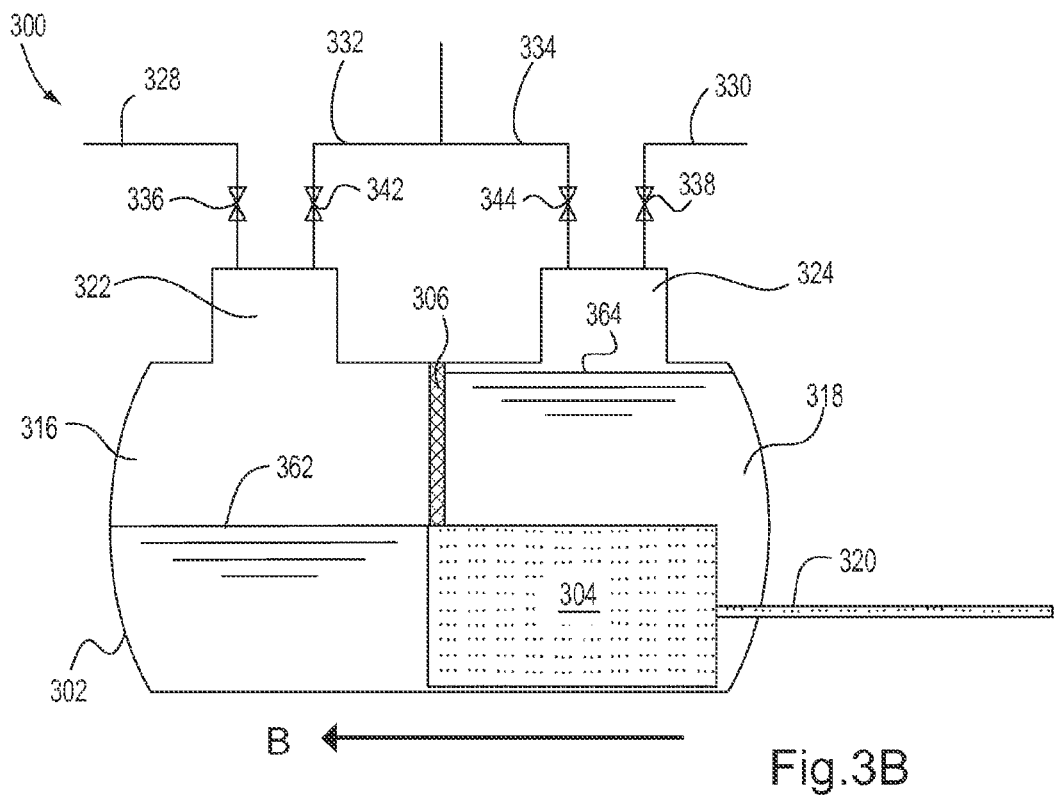

FIGS. 3A and 3B illustrate one complete compression cycle of another embodiment of a compressor device 300 having a similar configuration as the compressor device 100. Thus, some features of the compressor device 300 that are the same as compressor device 100 will not be described in detail with reference to FIGS. 3A and 3B. In this embodiment, the compressor device 300 includes a cylinder or pressure vessel 302, a piston 304 movably disposed within an interior region of the cylinder 302, and a baffle 306. The baffle 306 is disposed within the interior region of the cylinder 302 and is attached to the cylinder 302.

The piston 304 and the baffle 306 collectively divide the interior region between a first interior region 316 and a second interior region 318 and can be coupled to an actuator (not shown) via a piston rod 320 as described previously. The actuator can be used to move the piston 304 back and forth within the interior region of the cylinder 302. As the piston 304 moves back and forth within the interior region of the cylinder 302, a volume of the first interior region 316 and a volume of the second interior region 318 will each change. For example, the piston 304 can be moved between a first position in which the second interior region 318 has a greater volume than a volume of the first interior region 316, as shown in FIG. 3A, and a second position in which the first interior region 316 has a greater volume than a volume of the second interior region 318 as shown in FIG. 3B.

The first interior region 316 can include a first inlet/outlet chamber 322 and the second interior region 318 can include a second inlet/outlet chamber 324. The first inlet/outlet chamber 322 can include an inlet conduit 328 (also referred to as "inlet" or "air inlet") and an outlet conduit 332 (also referred to as "outlet" or "air outlet") each in fluid communication with the first interior region 316 of the cylinder 302. The cylinder 302 can contain within the first interior region 316 a fluid, such as a liquid and/or a gas that can be communicated to and from the first interior region 316 via the first inlet/outlet chamber 322. The inlet conduit 328 can be coupled to for example, a source of gas, such as air. The outlet conduit 332 is configured to communicate a volume of compressed gas (e.g., air) from the first interior region 316 to another location. For example, the outlet conduit 332 can be coupled to another compressor/expander device or another device configured to perform some action or work, or to a storage container configured to store compressed air. Valves 336, 342 can be coupled to the inlet conduit 328 and the outlet conduit 332, respectively, and can be operated to open and close the fluid communication to and from the cylinder 302. As discussed above, examples of operation of such valves are also described in the Compressor and/or Expander Device applications incorporated by reference above.

The second inlet/outlet chamber 324 can include an inlet conduit 330 (also referred to as "inlet" or "air inlet") and an outlet conduit 334 (also referred to as "outlet" or "air outlet") each in fluid communication with the second interior region 318 of the cylinder 302. The cylinder 302 can contain within the second interior region 318 a fluid, such as a liquid and/or a gas that can be communicated to and from the second interior region 318 via the second inlet/outlet chamber 324. The inlet conduit 330 can be coupled to for example, a source of gas, such as air. The outlet conduit 334 is configured to communicate a volume of compressed gas (e.g., air) from the second interior region 318 to another location. For example, the outlet conduit 334 can be coupled to another compressor/ expander device or another device configured to perform some action or work, or to a storage container configured to store compressed air. Valves 338, 344 can be coupled to the inlet conduit 330 and the outlet conduit 344, respectively, and can be operated to open and close the fluid communication to and from the cylinder 302. The air inlet valves 336, 338, and the air outlet valves 342, 344, can be any valve suitable for compressed air systems. Particularly, the air inlet valves 336, 338 and the air outlet valves 342, 344 can be configured to open and close rapidly to improve the speed and efficiency of both the compression and expansion operations.

In use, the piston 304 can be actuated or moved within the cylinder 302 to displace a first fluid to compress a second fluid disposed within the interior region of the cylinder 302. As described herein, the first fluid can be a liquid, and the second fluid can be a gas. More specifically, the liquid can be water, and the gas can be air. While the first fluid and second fluid may be referred to as water and air, it is contemplated that the first fluid and the second fluid can be any fluid and/or the same fluid. In this embodiment, the compressor device 300 is double-acting in that the piston 304 can be actuated to move or compress gas when moving in each of the two directions in which it moves. Said another way, the piston 304 can displace liquid disposed within the first interior region 316, and the liquid can compress gas within the first interior region 316. Similarly, the piston 304 can reduce the volume of the second interior region 318 and/or displace a first fluid to compress a second fluid disposed within the second interior region 318.

For example, during compression, a gas (e.g., air) having a first pressure can be introduced into the second interior region 318 via the inlet conduit 330. The valve 338 at the inlet conduit 330 can then be closed and the valve 344 at the outlet conduit 334 can be opened. The piston 304 can be actuated in the direction of arrow A as shown in FIG. 3A, to displace liquid disposed within the second interior region 318 from a first fluid level 362 as shown in FIG. 3A, to a second fluid level 364 as shown in FIG. 3B. During actuation the liquid moves or compresses the gas to move or displace the gas out of the second interior region 318 and into the outlet conduit 334. The gas moving out of the second interior region 318 will have a second pressure greater than the first pressure of the gas when it entered the second interior region 318. Simultaneously, as the piston 304 moves in the direction of arrow A, the valve 336 at the inlet conduit 328 can be open and the valve 342 at outlet 332 can be closed, such that air having a first pressure can be introduced or drawn into the first interior region 316 via the inlet conduit 328. As the air is drawn into the first interior region 316, the liquid within the first interior region 316 is moved from the second fluid level 364 to the first fluid level 362 as shown in FIG. 3B. The valve 336 at the inlet conduit 328 can then be closed and the valve 342 at the outlet conduit 332 can be opened. The piston 304 can then be actuated to move in the direction of arrow B as shown in FIG. 3B to move or displace the gas in the first interior region 316 out of the first interior region 316 and into the outlet conduit 332. The gas moving out of the first interior region 316 will have a second pressure greater than the first pressure of the gas when it entered the first interior region 316. As the gas is moved out of the first interior region 316, gas can simultaneously be introduced into the second interior region 318 via the inlet conduit 330, and the liquid in the second interior region 318 will be moved from the second fluid level 364 to the first fluid level 362 as shown in FIG. 3A. This cycle can continue as the piston 304 is moved back and forth within the cylinder 302.

While FIGS. 3A and 3B depict one embodiment of the compressor device 300 in which the force of gravity acts in a vertically downward direction with respect to FIGS. 3A and 3B (e.g., the liquid (e.g., water) within the interior regions shown at first fluid level 362 is disposed by the force of gravity at a bottom of the cylinder 302), the compressor device 300 may operate in alternative orientations. While FIGS. 3A and 3B depict the second fluid level 364 as remaining below the first and second inlet/outlet chambers 322, 324, it is contemplated that when the piston 304 is in the first position, the second fluid level 364 can be in the first inlet/outlet chamber 322; and when the piston 304 is in the second position, the second fluid level 364 can be in the second inlet/outlet chamber 324. Furthermore, the gas outlet valves 342, 344 are described above as being opened prior to the piston 304 being moved to begin the compression stroke. However, in alternative embodiments, the air outlet valves 342, 344 can be opened at other times during the compression stroke. For example, the air outlet valves 342, 344 can be opened when the pressure of the gas meets or exceeds a certain threshold, when the piston 304 is a predetermined distance from the beginning or end of the stroke, at the end of the stroke, or can only be partially opened at any given time.

As described herein with respect to FIGS. 3A and 3B, the compressor device 300 is operated such that the first interior region 316 and the second interior region 318 work alternatively, but in parallel, to compress gas for storage, or for a later stage of a compressor system. Alternatively, the first interior region 316 can discharge compressed gas to the second interior region 318, thus acting as a two-stage compressor. In this embodiment, the second interior region 318 (i.e., the second stage) can have a higher fluid level or the compressor device 300 can be designed asymmetrically such that the second interior region 318 is smaller than the first interior region 316. Said another way, the compressor device 300 described herein can be designed and/or operated in a variety of configurations by altering the volume of fluid in one or both interior regions, or by altering external valve arrangement. For these reasons, the compressor device 300 is highly adaptable and scalable.

The device 300 can also be operated in an expansion mode to extract energy from a compressed gas. Note that in the following description of an expansion mode, the action of the "inlet" and "outlet" valves reverses with respect to the cylinder 302. In an expansion mode, the "outlet" valve admits air into cylinder 302. The expansion operation is similar to the compression operation described above, thus continued reference can be made to FIGS. 3A and 3B. As shown in FIG. 3A, the piston 304 is in the first position within the first interior region 316. The air inlet valve 336 can be closed to prevent compressed air from escaping the first interior region 316, the air outlet valve 344 can be closed to prevent compressed air from entering the second interior region 318, and the air inlet 338 can be opened to allow relatively low pressure air within the second interior region 318 to communicate from cylinder 302 through air inlet valve 338 into air inlet conduit 330 (now acting as an outlet). The air outlet valve 342 can be opened to allow compressed air from the storage structure, from another expansion device, or from any other compressed air source, to enter the first interior region 316 via the outlet conduit 332 (now acting as an inlet). The relatively high pressure of compressed air increases the pressure of the water within the first interior region 316. The relatively high pressure of water in the first interior region 316, with respect to the relatively low pressure water in the second interior region 318, results in a net force on piston 304 and connected piston rod 320 in the direction of arrow A in FIG. 3A. The exerted force may cause translational motion of the piston 304 and the piston rod 320, also causing the fluid level 364 to drop within the first interior region 316. As the piston 304 moves from the first position (FIG. 3A) to the second position (FIG. 3B), the fluid level 362 in the second interior region can rise and force air out of the second interior region 318 through the air inlet 330 (now acting as an outlet).

FIG. 3B depicts the piston 304 in the second position. When the piston 304 is in the second position during the expansion operation, the air inlet valve 338 can be closed to prevent compressed air from escaping the second interior region 318, the air outlet valve 342 can be closed to prevent compressed air from entering first interior region 316, and the air inlet valve 336 can be opened to allow air within the first interior region 316 to escape. The air outlet valve 344 can be opened to allow compressed air from a storage structure, from another expansion device, or from any other compressed air source, to enter the second interior region 318 via the air outlet conduit 334 (now acting as an inlet). The compressed air increases the pressure of the water within the second interior region 318, relative to the pressure of the water in the first interior region 316 resulting in a net force against the piston 304. The net force may be allowed to cause a translational motion of piston 304 in the direction of arrow B from the second position within the second interior region 318 to the first position within the first interior region 316. As the piston 304 moves from the second position to the first position, the fluid level 362 can rise and can force air out of the first interior region 316 through the air inlet conduit 328 (now acting as an outlet).

Furthermore, while the described expansion operation describes closing the air outlet valve 342 after the piston 304 reaches the second position, it is contemplated that the air outlet valve 342 can be closed at other times during the expansion of fluid within the first interior region 316. By way of example, the air outlet 342 can be opened when the pressure of fluid within first interior region meets or drops below a certain threshold, can open when the piston 304 is a predetermined distance from the second position, or can only be partially closed at any given time. Similarly the air inlet valve 338 can be closed before the piston 344 is in the second position and/or the air outlet valve 344 can be opened before the piston 304 is in the second position. In this manner, the early closing or partial closing of the air inlet valve 338 and/or the early opening or partial opening of the air outlet valve 344 can slow the piston 304 and in doing so can prepare the piston 304 to return to the first position. The valve operation described above works in a similar manner when the piston 304 travels from the second position to the first position. As the piston 304 cycles from the first position to the second position and back, the piston rod 320 can be connected to a device that converts translational motion into useful action. For example, the piston rod 320 can connect to an actuator (not shown) that can turn an alternator (not shown) which can produce energy, and the energy can be supplied to the power grid (not shown).

FIG. 4 illustrates a compressor device 200 having a similar configuration as the compressor device 100. Thus, some features of the compressor device 200 that are the same as compressor device 100 will not be described in detail with reference to FIG. 4. In this embodiment, the compressor device 200 includes a first interior region 216, a second interior region 218, a first inlet/outlet chamber 222, a second inlet/outlet chamber 224, air inlets 228 and 230, air outlets 232 and 234, air inlet valves 236 and 238, air outlet valves 242 and 244, at least one fill/empty line 246, at least one fill/empty valve 248, at least one vent 252, and at least one vent valve 254.

In this embodiment, the compressor device 200 includes a first baffle 226 and a second baffle 266, a piston 204, a piston rod 220, at least one heat transfer element or fin 258, at least one heat exchanger 272, a coolant inlet 274, and a coolant outlet 276. FIG. 4 depicts an embodiment in which the interior regions 216, 218, and the baffles 226, 266, are at the top of cylinder 202 with respect to gravity. The heat exchanger 272 can be any traditional heat exchanger and can be integral to, or operate separately from, the at least one fin 258. By way of example, a coolant can flow into the heat exchanger 272 by way of the coolant inlet 274, can absorb heat from a fluid within the cylinder 202, and can flow out of the heat exchanger 272 by way of the coolant outlet 276 where the coolant can itself be cooled, or disposed of.

The first baffle 226 and the second baffle 266 can be fixedly disposed within the interior region of the cylinder 202 and can divide the interior region between the first interior region 216, the second interior region 218, and a piston region disposed between the first interior region 216 and the second interior region 218. In some embodiments, the piston 204 may further divide the piston region into a first piston region portion 282, on one side of the piston 204, and a second piston region portion 284, on a second side of the piston 204, opposite the first side of the piston 204, as shown in FIG. 4. As depicted in FIG. 4, the piston 204 can be disc-shaped, and can travel a distance defined between the first baffle 226 and the second baffle 266. The piston 204 can include a first piston surface 286 and a second piston surface 288. Furthermore, the piston rod 220 can extend through the piston 204, or can include two piston rods 220, and can exit the cylinder 202 at two locations. In this manner, the piston rod 220 can be operatively coupled to more than one actuator (not shown). For example, the portion of the piston rod 220 extending from one side of the cylinder 202 can be coupled to an actuator and the portion of the piston extending from the other side of the cylinder 202 can be coupled to another actuator. In this configuration, each actuator can be either single acting, i.e. each actuator can move the piston 204 in one direction, or can be double acting, i.e. each actuator can move the piston 204 in both or two directions. Alternatively, a single piston rod 220 can extend from the piston 204 and can exit the cylinder 202 at a single location. In this manner, the piston rod 220 can be operatively coupled, for example, to a double acting actuator.

In some embodiments, the piston 204 can move from a first position, at or near the first baffle 226, within the piston region to a second position, at or near the second baffle 266, within the piston region. When the piston 204 moves from the first position to the second position, fluid within the second piston region portion 284 can be moved into the second interior region 218, and fluid with the first interior region 216 can be moved into the first piston region portion 282. When the piston 204 moves from the second position to the first position, fluid within the first piston region portion 282 can be moved into the first interior region 216, and fluid within the second interior region 218 can be moved into the second piston region portion 284. When fluid moves to or from the first interior region 216 to or from the first piston region portion 282, fluid can contact the first baffle 226 and can pass across the area between the first baffle edge 227 and the interior perimeter of cylinder 202. When fluid moves to or from the second interior region 218 to or from the second piston portion 284, fluid can contact the second baffle 266 and can pass between second baffle edge 267 and the interior perimeter of cylinder 202. When fluid contacts either the first baffle 226 or the second baffle 266, and/or passes across either the first baffle edge 227 or the second baffle edge 267, a pressure drop can occur. The first baffle 226, the first baffle edge 227, the second baffle 266, and the second baffle edge 267, can be configured to reduce this pressure drop and can result in a higher efficiency for the compressor 200 and the system in which it is embodied. In some embodiments, the size of each of the first baffle 226 and the second baffle 266 may be changed, such as, for example, the size of each of the baffles 226, 266 can be reduced to create a bigger opening (not shown) between the piston region and the first and/or the second interior regions 216, 218. In some embodiments, each of the baffle edges 227, 267 may be shaped hydrodynamically, such as, for example rounded, bulbous, angled, etc. In other embodiments, the baffles 226, 266 can be movable with respect to the cylinder 202 and/or with respect to each other to alter the relative volumes of liquid and gas in the first interior region 216 and the second interior region 218. The movable baffles 226, 266 can allow the operating characteristics of the device 200 to be changed without changing other components in the compressor 200.

In some embodiments, each of the baffles 226, 266, and each of the edges of baffle edges 227, 267, can be sized and shaped to maintain a fluid level within a piston region portion (282, 284) relative to a fluid level in an interior region portion (216, 218). Using the first interior portion 216 and the first piston region portion 282 as an example, the movement of the piston 204 from the first position to the second position can create suction within the first piston region portion 282 that can cause a fluid level 292 within the first piston region portion 282 to stay substantially the same. In this manner, the fluid level 292 within the first piston region 282 can be higher than the fluid level 262 in the first interior region 216 when the piston 204 reaches the second position. In such an embodiment, when the piston 204 returns to the first position from the second position, a higher portion (e.g., in a vertical direction in this example) of the first piston surface 286 can contact the liquid within the first piston region portion 282. By way of example, in the absence of the first baffle 226, the fluid level 262 within the first interior region 216 and the fluid level 292 within the first piston region 282 can be substantially the same, limiting the portion of the piston surface 286 in contact with the liquid when the piston 204 reaches the second position. Increasing the portion of the first piston surface 286 that is in contact with liquid can increase the efficiency of the compressor 200 by increasing an amount of energy transferred from the actuator to the piston 204, and subsequently from the piston 204 to the compressed gas.

While the compressor 212 is configured differently from compressor 100, the operation of the compressor 200 is similar to that illustrated in FIGS. 3A and 3B. By way of example, as the piston 204 moves from a first position at or near the baffle 226 to a second position at or near the second baffle 266, the fluid level 264 can rise and can compress a second fluid within the second interior region 218; the fluid level 262 can drop and can allow atmospheric or pre-compressed air to flow into the first interior region 216; and the fluid levels in the first piston region portion 282 and the second piston region portion 284 can remain substantially the same. Similarly, as the piston 204 moves from the second position to the first position, the fluid level 262 can rise and can compress a second fluid within the first pressure vessel 216; the fluid level 264 can drop and can allow atmospheric air or pre-compressed air flow into the second interior region 218; and the fluid level 292 in the first piston region portion 282 and the second piston region portion 284 can remain substantially the same. The operation of the valves 236, 238, 242, and 244 can operate in a manner similar to the valves 136, 138, 142, and 144.

The compressor devices (e.g., 10, 100, 200, 300) described herein can be used for a variety of different functions. In one example use, a compressor device as described herein can be used within a CAES system as described, for example, in the Compressor and/or Expander Device applications incorporated by reference above. The compressor devices (e.g., 10, 100, 200, 300) described herein can also be configured to expand a gas (e.g., air). The below example illustrates a two stage compression/expansion system that includes a compressor device as described herein. It should be understood, however, that the compressor devices described herein can be used in a variety of different types of CAES systems having any number of compression and expansion stages.

Figure 5:
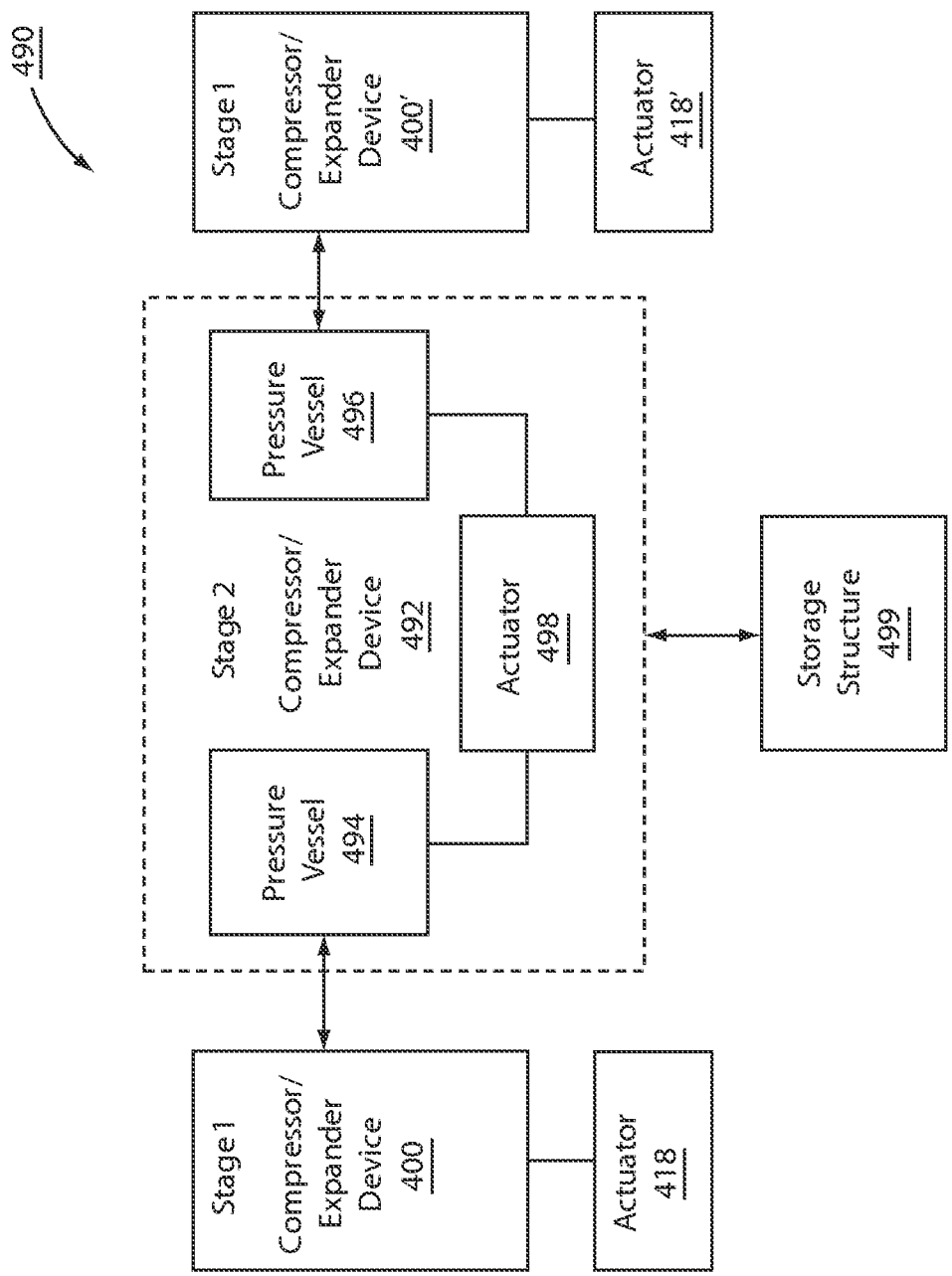
FIG. 5 is a schematic illustration of a compression and expansion system according to an embodiment.

FIG. 5 is a schematic illustration of a CAES system that includes a compressor device as described herein. The CAES system 490 includes compressor/expander devices arranged in series to create multiple stages of compression and expansion of gas (e.g., air). The first stage includes a compressor/expander device 400 and a compressor/expander device 400', and the second stage includes a compressor/expander device 492.

The compressor/expander device 400 and the compressor/expander device 400' can each be double-acting and configured similar to or the same as, for example, compressor devices 10, 100, 200, 300 described herein. The compressor/expander device 400 can be coupled to an actuator 418, and the compressor/expander device 400' can be coupled to an actuator 418'. The actuator 418 and the actuator 418' can each be configured to actuate a piston (not shown) disposed within a cylinder or pressure vessel (not shown) of the compressor/expander devices 400 and 400', respectively, to move the pistons back and forth within the cylinders, as described above with reference to previous embodiment. In some embodiments, a single actuator (e.g., 418 or 418') can be used to actuate both compressor/expander devices 400 and 400' simultaneously.

The compressor/expander device 492 can include a first pressure vessel 494 and a second pressure vessel 496, connected in fluid communication to an actuator 498, as described in the Compressor and/or Expander Device applications incorporated by reference above. In other configurations, there could be one, three, four, or more pressure vessels in each stage. The actuator 498 can include a water pump (not shown) that drives a hydraulically driven piston (not shown) disposed within a housing (not shown) and can be driven with one or more hydraulic pumps (not shown) to alternately reduce and then increase the internal air volume within the first pressure vessel 494 of the compressor/expander device 492 (with an equivalent, but opposite increase and reduction of air volume in the second pressure vessel 496 of the compressor/expander device 492). Each of the pressure vessels 494 and 496 are at least partially filled with a liquid, such as water, that is moved by the actuator 498 to alternately compress and drive air from the volume of each of the pressure vessels, when operated in a compression mode, or to be moved by compressed air received in either of the pressure vessels when operated in an expansion mode.

Each of the compressor/expander devices 400 and 400' can be coupled to a source of air and the compressor/expander device 492 can be fluidly coupled to a storage structure 499. In use, to compress air for storage, air can enter the CAES system 490 at the first stage, be compressed and moved to the second stage for further compression before being moved to the storage structure 499. During the compression process, heat can be removed from the air by various heat removal or transfer methods, as described, for example, in the Compressor and/or Expander Device applications incorporated herein.

At a subsequent time, compressed air may be released from the storage structure 499 and expanded through the second stage, moved to the first stage where it is further expanded, and eventually provided to, for example, an actuator (not shown) that drives a motor/alternator (not shown) to produce electricity. Heat at a relatively low temperature (e.g., between for example, about 10° C. and about 99° C.) may be added to the air during expansion to increase the power generated during the expansion process.

More specifically, air can be drawn into a first interior region of a cylinder of the compressor/expander device 400, while simultaneously air within the second internal region of the cylinder of the compressor/expander device 400 is compressed as described herein. The compressed air is moved to the first pressure vessel 494 of the compressor/expander device 492 where it is subsequently further compressed before being transferred to the storage structure 499. Similarly, air can be drawn into a first interior region of the compressor/expander device 400', while simultaneously air within the second internal region of the compressor/expander device 400' is compressed as described herein. The compressor/expander devices 400 and 400' can be configured to work in cooperation with the alternating compression cycles of the first pressure vessel 494 and the second pressure vessel 496 of the compressor/expander device 492. The process can work in reverse to expand compressed air from the storage structure 499 as described above.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. The specific configurations of the various components can also be varied. For example, the size and specific shape of the various components can be different than the embodiments shown, while still providing the functions as described herein.

What is claimed is:

1. An apparatus, comprising:
   a pressure vessel in which at least one of a liquid and a gas can be contained;
   a piston movably disposed within the pressure vessel for reciprocating movement therein along solely a portion of a cross-sectional area of the pressure vessel; and
   a divider fixedly disposed within the pressure vessel along a remaining portion of the cross-sectional area of the pressure vessel, the divider and the piston collectively dividing the pressure vessel into, and defining therewith, a first interior region and a second interior region, the divider forming a seal with the piston to prevent fluid from passing between the first interior region and the second interior region, wherein the first interior region and the second interior region are adapted to simultaneously contain a liquid;

the piston being movable between a first position in which the first interior region has a volume less than a volume of the second interior region, and a second position in which the second interior region has a volume less than a volume of the first interior region.

2. The apparatus of claim 1, further comprising:
a first heat transfer element disposed within the first interior region operable to transfer heat energy from a gas being compressed in the first interior region to the exterior of the first interior region; and
a second heat transfer element disposed within the second interior region operable to transfer heat energy from a gas being compressed in the second interior region to the exterior of the second interior region.

3. The apparatus of claim 1, further comprising:
a first heat transfer element disposed within the first interior region operable to transfer heat energy from the exterior of the first interior region to a gas being expanded in the first interior region; and
a second heat transfer element disposed within the second interior region operable to transfer heat energy from the exterior of the second interior region to a gas being expanded in the second interior region.

4. The apparatus of claim 1, further comprising:
a purge conduit in fluid communication with the first interior region of the pressure vessel, the purge conduit configured to communicate a first volume of liquid having a first temperature from the first interior region of the pressure vessel to a location outside of the pressure vessel, and communicate a second volume of liquid having a second temperature different than the first temperature to the first interior region of the pressure vessel.

5. The apparatus of claim 4, wherein the purge conduit is a first purge conduit, the apparatus further comprising a second purge conduit in fluid communication with the first interior region of the pressure vessel, the second purge conduit configured to communicate a third volume of liquid having a third temperature from the first interior region of the pressure vessel to a location outside of the pressure vessel, and communicate a forth volume of liquid having a forth temperature different than the third temperature to the first interior region of the pressure vessel.

6. The apparatus of claim 1, wherein the first interior region includes a first inlet/outlet chamber and the second interior region includes a second inlet/outlet chamber.

7. A method of compressing gas in a pressure vessel, the pressure vessel having a piston disposed therein for reciprocating movement in the pressure vessel along solely a portion of a cross-sectional area of the pressure vessel and a divider fixedly disposed within the pressure vessel along a remaining portion of the cross-sectional area of the pressure vessel, the divider and the piston collectively dividing the pressure vessel into, and defining therewith, a first interior region and a second interior region, the divider forming a seal with the piston to prevent fluid from passing between the first interior region and the second interior region, the first interior region and the second interior region being adapted to simultaneously contain a liquid, the method comprising:
fluidically isolating the first interior region from a gas source;
establishing fluid communication between the second interior region and the gas source;
moving the piston with respect to the divider in a first direction to: a) reduce the volume of the first interior region and compress a first mass of gas contained therein from a first pressure to a second pressure higher than the first pressure, and b) increase the volume of the second interior region and receive therein a second mass of gas at a third pressure from the gas source.

8. The method of claim 7, further comprising:
fluidically isolating the second interior region from the gas source;
establishing fluid communication between the first interior region and the gas source;
moving the piston with respect to the divider in a second direction, opposite the first direction, to: a) reduce the volume of the second interior region and compress the second mass of gas contained therein from the third pressure to a fourth pressure higher than the third pressure, and b) increase the volume of the first interior region and receive therein a third mass of gas from the gas source.

9. The method of claim 7, wherein the first interior region contains a volume of liquid, the method further comprising:
causing the temperature of the first mass of gas to increase to a temperature above a temperature of the volume of liquid, and
causing heat energy produced by compression of the first mass of gas to be transferred from the first mass of gas to the volume of liquid.

10. The method of claim 9, wherein the volume of liquid is a first volume of liquid having: a) a first temperature before the piston is moved in the first direction, and b) a second temperature greater than the first temperature after the piston is moved and the heat energy is transferred from the first mass of gas to the volume of liquid, the method further comprising:
removing a portion of the first volume of liquid having a second temperature from the first interior region, and
introducing a second volume of liquid having a third temperature less than the second temperature to the first interior region.

11. The method of claim 7, wherein the first interior region includes an intermediate structure disposed therein, the method further comprising:
causing the temperature of the first mass of gas to increase to a temperature above a temperature of the intermediate structure, and
causing heat energy produced by compression of the first mass of gas to be transferred from the first mass of gas to the intermediate structure.

12. The method of claim 11, wherein the first interior region contains a volume of liquid, the method further comprising:
causing at least a portion of the volume of liquid to contact a portion of the intermediate structure to which heat energy has been transferred from the gas, and
causing heat energy to be transferred from the intermediate structure to the liquid.

* * * * *